United States Patent

Meng et al.

[11] Patent Number: 6,001,510
[45] Date of Patent: Dec. 14, 1999

[54] METHOD FOR PRODUCING LASER HOLOGRAM ANTI-COUNTERFEIT MARK WITH IDENTIFYING CARD AND INSPECTING CARD AND INSPECTING APPARATUS FOR THE MARK

[76] Inventors: Wu Meng, No. 28 Xinhuazhong Rd.; Tianyun Jin, PO Box 1270; Shiguang Yan; Mingxi Zhao, both of PO Box 1270, all of Beijing, China

[21] Appl. No.: 08/776,840

[22] PCT Filed: Aug. 15, 1995

[86] PCT No.: PCT/CN95/00063

§ 371 Date: Feb. 2, 1998

§ 102(e) Date: Feb. 2, 1998

[87] PCT Pub. No.: WO96/05540

PCT Pub. Date: Feb. 22, 1996

[30] Foreign Application Priority Data

Aug. 15, 1994 [CN] China ................................. 94114863

[51] Int. Cl.$^6$ ................................................. G03H 1/00
[52] U.S. Cl. ................ 430/1; 283/86; 235/457; 235/380; 430/2; 382/210; 359/32; 359/29
[58] Field of Search ................... 283/86; 430/1, 430/2, 321; 359/2, 32, 29; 235/457, 380; 382/210

[56] References Cited

U.S. PATENT DOCUMENTS

| | | | |
|---|---|---|---|
| 3,620,590 | 11/1971 | Barker | 430/1 |
| 3,894,756 | 7/1975 | Ward | 283/86 |
| 4,126,373 | 11/1978 | Moraw | 283/86 |
| 4,677,285 | 6/1987 | Taniguchi | 235/457 |
| 5,396,559 | 3/1995 | McGrew | 283/86 |
| 5,486,933 | 1/1996 | Shido et al. | 359/2 |
| 5,687,012 | 11/1997 | Kang et al. | 283/86 |

FOREIGN PATENT DOCUMENTS

| | | | |
|---|---|---|---|
| 6-110377 | 4/1994 | Japan | 359/2 |
| 6-110379 | 4/1994 | Japan | 359/2 |

*Primary Examiner*—Martin Angebranndt
*Attorney, Agent, or Firm*—Nikaido Marmelstein Murray & Oram, LLP

[57] ABSTRACT

The present invention provides a method for producing double-card anti-counterfeit marks with interlock protection based on the technique which combines nuclear technology with computer-generated hologram (CGH) technology and inspecting apparatus for the mark. The invention relates to the technical field of optical information processing in physics. The technical feature of the invention is to insert potential images R,T and matched potential images R',T' in the anti-counterfeit identification marks and in the inspecting identification marks respectively by means of charged particle track image in sampling coincidence with CGH. When R coincides with R', a certain message of genuineness for an identification mark will be shown, and when T coincides with T', different specific information in thousands of ways appears to prove the genuineness of the protected objects. Because of the microscopic characteristics of nuclear tracks and the distribution characteristics of the phase hologram on the frequency spectrum plane, the potential images R,T,R',T', as the information carriers, can't be duplicated and must be coincided respectively, so as to prevent the genuine anti-counterfeit marks from the illegal imitation.

12 Claims, 9 Drawing Sheets

FIG.1a
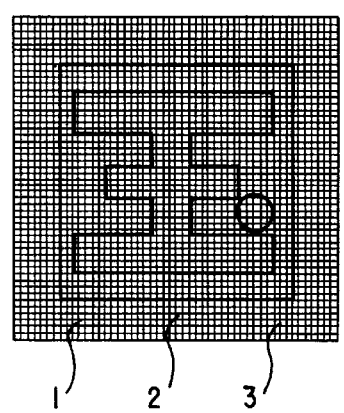
FIG.1b
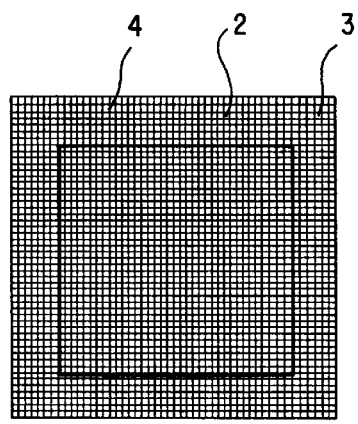
FIG.1c
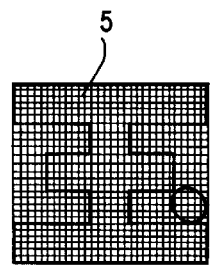
FIG.1d
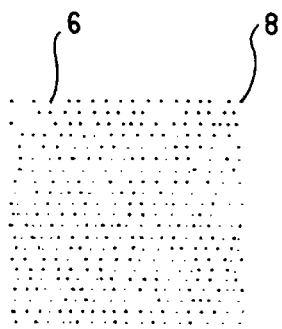
FIG.1e
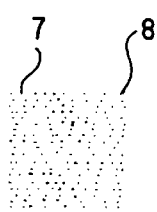
FIG.1f 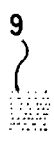 FIG.1g

FIG.2a
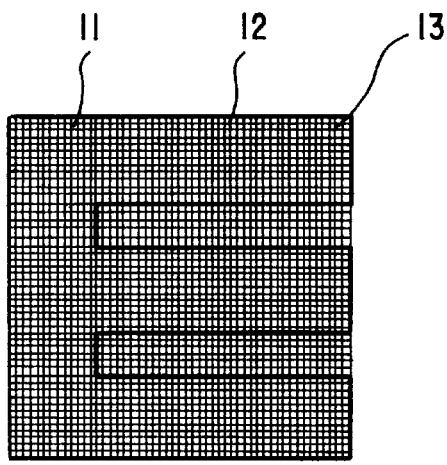
FIG.2b
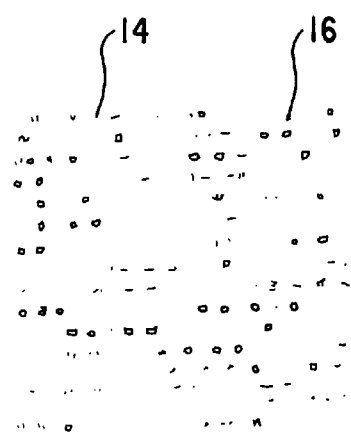
FIG.2c
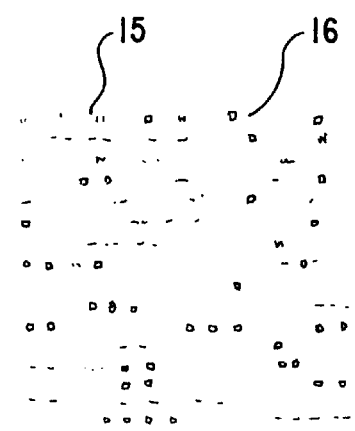
FIG.2d 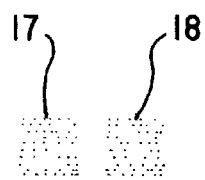 FIG.2e

6,001,510

METHOD FOR PRODUCING LASER HOLOGRAM ANTI-COUNTERFEIT MARK WITH IDENTIFYING CARD AND INSPECTING CARD AND INSPECTING APPARATUS FOR THE MARK

THE FIELD OF THE INVENTION

The present invention relates to the technical field of optical information processing in physics, more particularly, is concerned with a method for producing and inspecting double-card anti-counterfeit identification marks.

THE BACKGROUND OF THE INVENTION

A lot of anti-counterfeit technologies such as techniques based on temperature alternation, fluorescence and phosphorescence, implicit metal, laser hologram and etc. have been developed for checking bank-note, paper money, bill and trademarks. On Oct. 16, 1991, a Chinese patent for invention (application No.90105079.2) was disclosed, in which a method for producing a potential image in document was introduced. The potential image is inserted on a certain place of bank note or document, in case of necessity the potential image can be observed for identifying the genuineness. A method for producing a special kind of anti-counterfeit paper is disclosed in another Chinese patent published on Sep. 25, 1991 with application No.91102676. Color fabric thread is dispersed and processed first and then added into the paper pulp-making system for producing paper material contained color fabric thread. Through a paper machine, a kind of paper with uniform-distributed color fabric thread on its surface is manufactured. The feature of presenting clear and uniform color fabric thread differs from that of ordinary printing paper. The anti-counterfeit purpose can be achieved by using such kind of paper.

In recent years a kind of laser holographic method for anti-counterfeit identification mark has been developed in trademark protection. The technical processes for photography, plate making, printing are described in the book "Practical Hologram Photography" published by the Publishing House of Beijing Institute of Posts and Telecommunications. A Chinese patent published on Sep. 27, 1989 with application No.87205319 has also described a laser hologram method for anti-counterfeit identification. The feature is at the first step an embossed white light reconstructed hologram is taken by using photoresist plate as a recording medium and then the embossed image is transferred from the photoresist plate to a metallic plate by electric casting. Finally, a moulded master mask is obtained. The embossed hologram is duplicated on a piece of thermoplastic paper with aluminium film by die pressing for manufacturing the laser hologram anti-counterfeit identification mark. For its multicoloured diffraction effects, three-dimensional feeling, and difficulty to be copied, the rainbow hologram used to be in vogue for a time and considered as the most effective way for anti-counterfeit identification. However, infringers succeeded in imitating the above-mentioned laser hologram anti-counterfeit identification marks and used them as real certificate of their false products, causing heavy losses to manufacturees of famous trademark products and consumers. In a Chinese patent application No. 87205139 published on Nov. 16, 1988, and in a Canadian patent application with publication date Nov. 9, 1984 and filing No. 86132651 entitled "An apparatus for identifying real product by using optic interference and its production method", furthermore, in a German patent application No. 93168673 published on Feb. 29, 1992 entitled "Safe original document of credit card and ID card", technical methods have been introduced by which a secured bar code mark or a difficult-to-copy safety layer is added to the anti-counterfeit identification marks for proving the authenticity of bank notes, tickets, documents and trademarks. In spite of the complexity of the techniques, the counterfeiters spare no expense to acquire and master them. Although the counterfeiters are not able to make the fake identification marks exactly as the real ones, the consumers can not distinguish the authentics from the false for the unspecified information as fringes, fluorescent, magnetic granule and etc. because of their limited identifying ability. In order to achieve the exact anticounterfeit goal, identification marks should possess the following features: 1. The self-protecting function, e.g. to prove the authenticity of themselves before testifying the protected objects; 2. The impossibility to be copied; 3. The identifying capability under their various changeable circumstances; 4. The simple and definite method for checking their authenticity; 5. The one-off feasibility and reasonable cost for mass production.

The object of the invention is to provide a method for producing a double-card track laser hologram anti-counterfeit identification mark and its inspecting apparatus. By using nuclear track, laser speckles and optical information processing technique, the double-card, double-protection technical scheme for anti-counterfeit identification mark is carried out, namely one card for proving the reality of the mark itself and the other one for proving the reality of the object to be protected by the mark, so as to get rid of the fake disturbance from imitators.

THE SUMMARY OF THE INVENTION

The technical solution for implementing the object of the invention is as follows:

The general technical solution of the invention is to make at least two additional parts, R cards and T cards, on the double-card track laser hologram anti-counterfeit identification mark, and to make corresponding two parts of R' cards and T' cards on the inspecting identification mark. The use of charged particle track, laser speckles and optical information processing technique makes R, T and R', T' impossible to reproduce. When R card coincides with R', T card coincides with T', a prefixed information comes out under illumination of white light or laser beam. When R coincides with R', a relatively fixed information appears, proving the reality of the mark itself. When T card coincides with T' card, very different special information arises, proving the reality of protected objects. In this way the object of the present invention is achieved.

The detailed technical solution of the invention is as follows:

The double-card track laser hologram anti-counterfeit identification mark of the invention consists of an identifying card and an inspecting card, whose manufacturing method includes the following steps: firstly, the image original predetermined or randomly produced, or the spectrum original converted from the image original is divided arbitrarily into two parts, and then used as double-card master masks. By using optic method or CGH method at least one from the double-card master masks is transferred to a photoresist plate, at least the other one from the double-card master masks is transferred correspondingly to another photoresist plate. After normal developing, electroforming, die pressing and etc., the above mentioned two photoresist plates are used as identifying card and inspecting card respectively. Said image original may be any known picture, for example character, sign and so on, or any randomly produced pictures as laser speckles, charged particle tracks and etc., or the combination of the above mentioned images, for example nuclear tracks added to a predetermined image original. Said identifying card and inspecting card appear in pairs. In case of more than one pair, they may be composed of double-card master masks of space domain or spectrum domain separately or their combination. Among them the inspecting card can be presented in the form of computer software. The amount of pairs of identifying and inspecting cards depends on anti-counterfeit requirement for forming R—R' cards, T—T' cards and so on. These cards may be operated simultaneously or switched on successively by interlock for realizing multiple inspections.

The invention also provides an inspecting apparatus for said double-card track laser hologram anti-counterfeit identification mark. It includes a light source, an identifying card base and an inspecting card base with location function, an imaging system and a photo-electronic converting unit, a testing probe and a processor connected to the testing probe. In the apparatus the imaging system consisting of optical devices fitted in conversions of the identifying card and inspecting card possesses an inspecting screen for observing the results directly or can operate directly on the photo-electronic converter. The processor is connected to the photo-electronic unit and is controlled by the identifying program of the electronic identifying system. In the schematic diagram for the inspecting apparatus the structure of the optical system for the combination of identifying card with inspecting card is shown. It includes a double-arm dark box and an optical system, constructed by a light source, an expanding lens, and a collimation lens. At the end of the dark box, a reflection frame is installed, to which R' base, T' base and R, T bases are mounted. In the light reflection direction of the dark box, a Fourier lens and an inspecting screen for observing information image are installed in a distance of the focus length of the Fourier lens. On the reflection frame a pressing means is mounted. When the pressing means is pushed down on the identification mark, the location function is completed through adjusting the setting screw mounted on the chip to fix on the setting sign of the anti-counterfeit identification mark. The identifying card base and the inspecting card base consists of miniature physico-chemical materials. The setting function is realized through physico-chemical reaction of the identifying card base and the inspecting card base together with the setting sign of the identifying card and inspecting card.

Inspecting card R' is sealed in a device made of transparent material with a dismount-proof base plate, which consists of a dismount-proof screw, a pair of springs, a pair of pipes with open upper ends, and a pair of sliding-vanes, being able to slide in the pipes. When two sliding-vanes of a pair overlap one on another a half, a hole is drilled on them and then the sliding vanes are fixed by a dismount-proof screw, on the unoverlapped half parts of each sliding vane a hole is drilled and two springs are used to pull the vanes to both sides. The middle part of vanes is connected to R' card, if the dismount-proof screw moves away from sliding vanes, under the spring's force the two vanes jump away to both sides, making R' card connected with them broken.

Instead of human observation and identification, an inspecting screen of said inspecting apparatus is connected to a computer and relevant control programs are completed.

The operation procedure of said double-card track laser hologram anticounterfeit marks is as follows: R'card is sealed in the inspecting apparatus when the latter is manufactured, the inspecting card R' is used for protecting anti-counterfeit identification marks themselves; the inspecting card T' changes together with the protected object for proving the reality of commodity, ticket, certificate or bank note. A said anti-counterfeit identification mark may comprise an ordinary laser hologram mark made by the prior art, R card corresponding to R' card, and T card corresponding to T' card. When an anti-counterfeit mark is inspected, the incident light illuminates R',T',R, T cards at the same time, and the reflection light passes through the Fourier transformation lens and causes reconstructed images R'R and T'T on the observation screen. When necessary, the two reconstructed images can be made more, and it is also possible to display reconstructed images directly. The coincidence of R card with R' card of marks proves the reality of marks themselves and the coincidence of T card with T' card of marks proves the reality of the protected object.

The prior art of anti-counterfeit technologies laid stress on progress of technology of anti-counterfeit identification marks and improvement to anti-counterfeit measures, although the techniques for producing marks have been becoming more and more advanced and adopting more and more encrypted methods, disturbs from imitators can not be cast off all along. To counter the infringer's essential feature of concealing their infringing acts, the present invention implements the following steps:

Firstly, microscopic nuclear track of three-dimensional image that is impossible to copy artificially, or irregular stereographical particles assigned by computer are taken as information carrier and put into the corresponding intermediate carrier R R' cards. Then a half of R' cards sealed in an inspecting device, is distributed. If the image original is unknown, it is impossible for anyone including the inventor himself to copy R card corresponding to R'card. Even if R' is taken out completely from the sealed dismount-proof base plate, it's still impossible to copy R' card corresponding to R card. When the laser beam illuminates the R' card and R card simultaneously, however, a specified information appears on the observation screen which consists of nuclear tracks of three-dimensional image and is very distinguishable to the broad consumers. The method provides the state's administrative departments with a powerful means for identifying the reality of commodity. On one hand, R'card together with the inspecting apparatus are used to prove the reality of the anti-counterfeit identification card; on the other hand, R card in the identification mark and the protected object—to prove the reality of the inspecting apparatus and R'card. Secondly, T' card corresponding to T card is adopted for proving the reality of the object to be protected.

BRIEF DESCRIPTION OF DRAWINGS

FIGS. 1a–1g: Schematic drawing showing the CGH double-card master mask made by picture-separating method;

FIGS. 2a–2e: Schematic drawing showing the CGH double-card master mask made by random sampling on frequency spectrum plane;

EMBODIMENT 1

Figure 3A:
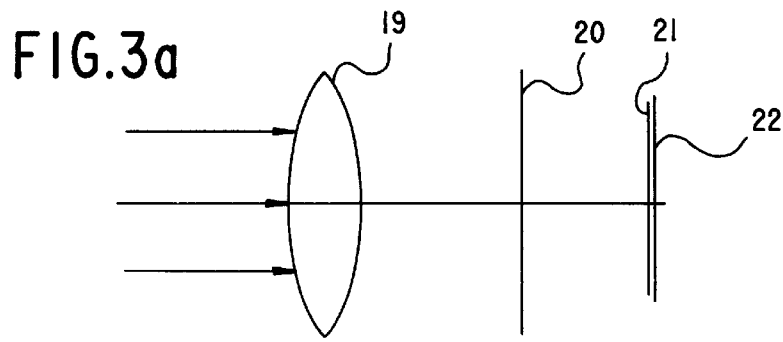
FIGS. 3a–3g: Schematic drawing showing the CGH double-card master mask made by means of laser speckles.
Figure 3B:
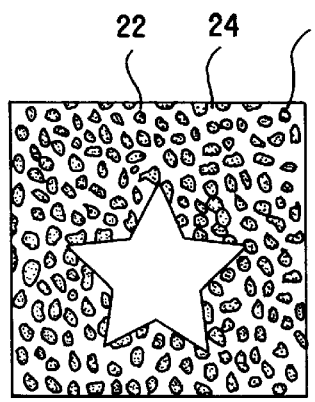
Figure 3C:
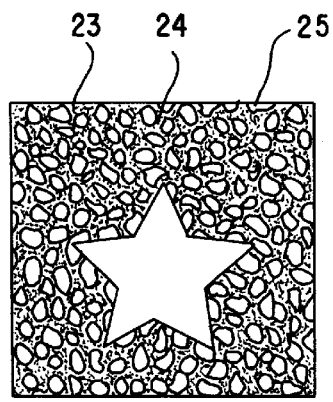
Figure 3D:
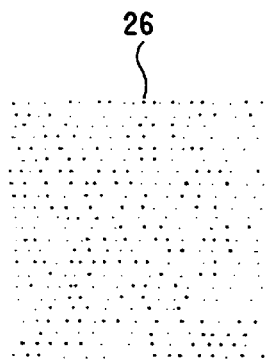
Figure 3E:
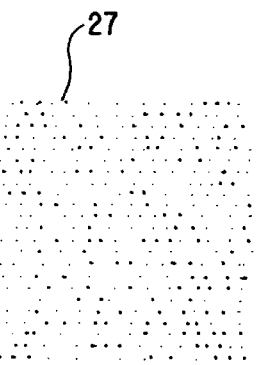
Figures 3F, 3G:
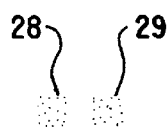
Figure 4A:
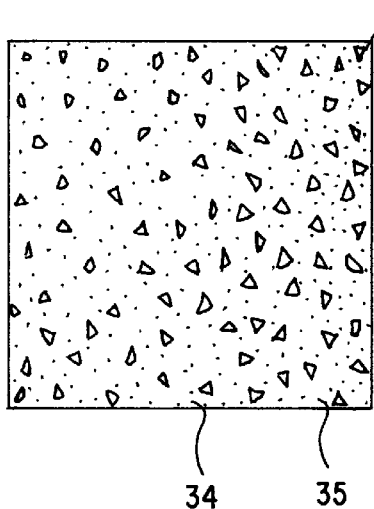
FIGS. 4a–4h: Schematic drawing showing the nuclear track laser hologram doublecard master mask made by CGH method.
Figure 4B:
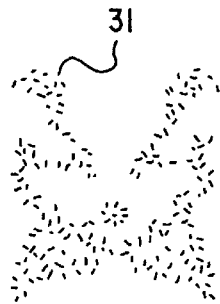
Figure 4C:
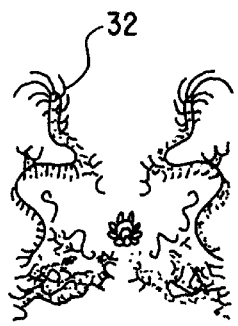
Figure 4D:
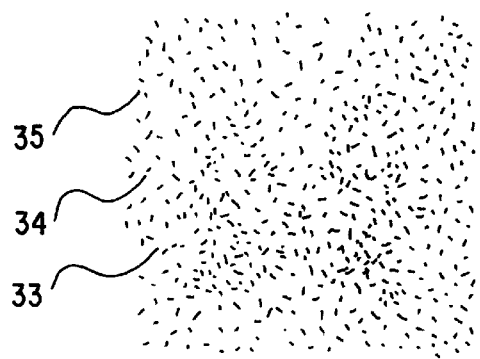
Figure 4E:
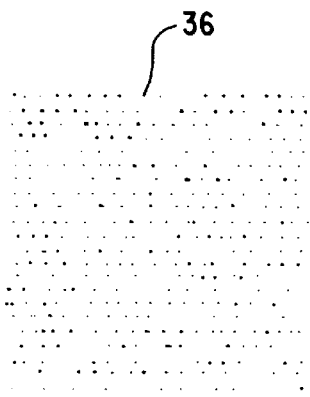
Figure 4F:
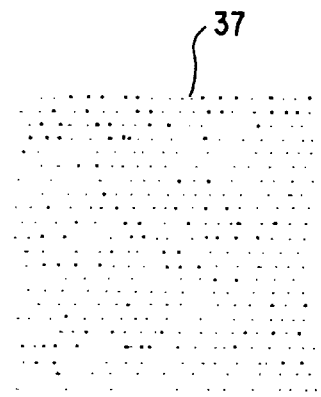
Figure 4G:
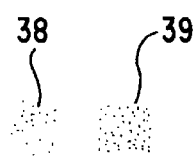
Figure 4H:

The present embodiment illustrates a method for producing CGH identification card and inspecting card by using picture-separating method.

FIG. 1 is a schematic drawing showing the CGH double-card master mask by using picture-separating method. When a Chinese character "围" is to be displayed, first of all the character "围" should be plotted on a piece of coordinate-paper with 128×128 squares. This picture is called the original picture (1). Each square corresponds to a sampling cell (2), the sampling points (3) are chosen at the top points of the squares. The character "围" is divided into two parts: "囗" and "王". Part "囗", also consisting of 128×128 sampling points, is called the sub-original picture (4). Part "王", called sub-original picture (5), consists of 64×64 sampling points. After that the assignment of these pictures is carried out: value "1" is assigned to the sampling points inside the pictures, value "0"—to the sampling points outside the pictures. Consequently, two real matrixes $A_4$ and $A_5$ are obtained. Being input the two matrixes into computer and multiplied each matrix element by a random phase factor, these matrixes transform into two complex matrixes $A'_4$ and $A'_5$. According to the fast Fourier transformation(FFT) process these complex matrixes $A_4$ and $A_5$ are converted to complex matrixes $B_4$ and $B_5$, where:

$(B_4)ir=|(B_4)ir|\exp[j\phi 4(i,r)]$ $(B_5)uv=\sqrt[3]{(B_5)uv}|\exp[j\phi 5(u,v)]$ All matrix elements are normalized: let the maximum of $|(B_4)ir|$ and $|(B_5)uv|$ be equal to 1 and the other elements are reduced proportionally.

A program for computerized drawing has been developed. 128×128 sampling cells for character "囗" and 64×4 sampling cells for character "王" on the frequency spectrum plane are given. All the cells have a equal sampling interval $\delta\mu$ and equal sampling area $\delta\mu^2$. In every sampling cell (8) some small rectangles are plotted, the width of which is ½$\delta\mu$ and the height is the normalized amplitude of the corresponding matrix element. The distance P from the center of matrix to the center of sampling unit is proportional to phase $\phi$ of the corresponding matrix element:

Pir=$\phi_4(ir)/2\pi M_4$, Puv=$\phi_5(uv)/2\pi M_5$,

Let $M_4=M_5=1$, then Pir=$\phi_4(ir)/2\pi$, Puv=$\phi(uv)/2\pi$.

By means of the above mentioned method, the double card discrete Fourier transformation hologram (6) and (7) are obtained. Being proportionally reduced by microphotography with the help of a micro-camera, the doublecard discrete Fourier transformation hologram (6) and (7) are transformed to double-card master masks (9) and (10) of width $\Delta\mu_4$=4.8 mm and $\Delta\mu_5$=2.4 mm.

By using the prior art, a rainbow hologram is made on a photoresist plate. One of the double-card master masks (9) is transferred to a photoresist plate as master mask R. By using the optical method, the other card of the double-card master masks is transferred to another photoresist plate for making master mask R'. Processed by available technology, such as developing, washing, electromoulding, die pressing and so on, double-card identification mark card R and inspecting card R' are obtained. The R' card is solidified in the inspecting apparatus and the identification marks should be pasted on the protected objects.

EMBODIMENT 2

This embodiment illustrates manufacturing technology of CGH anti-counterfeit identification card and inspecting card by using random sampling on frequency spectrum plane.

FIG. 2 is a schematic drawing showing the CGH double-card master mask by random sampling on a frequency spectrum plane. If the English letter 'E' is to be displayed, it is necessary to write it on a piece of coordinate paper with 64×4 small squares. This picture is called the original picture (11). Every small square is considered as a sampling unit (12), the sampling point (13) is chosen at the top point of the square. Assignment to letter 'E' is as follows: value '1' is given to the sampling points inside the picture and value '0'—outside the picture. So a real matrix $A_{(11)}$ is obtained. The matrix $A_{(11)}$ is stored in the computer. Being multiplied each matrix element by a random phase factor, the matrix $A_{(11)}$ transforms to a complex matrix $A_{(11)}$. Then the matrix $A_{(11)}$ transforms to a complex matrix $B_{(11)}$ by FFT process:

$(B_{11})(ir)=|(B_{11})(ir)|\exp[j\phi(ir)]$

Let the maximum for $|B_{11}(ir)|$ be equal to 1, the matrix $B_{(11)}$ is normalized.

A computer program has been developed for controlling computerized plotting. There are 64×4 sampling cells and 64×4 sampling points on the frequency spectrum plane. The sampling interval is $\delta\mu$ with a small rectangle plotted in each sampling cell. The density of the rectangle is ½$\delta\mu$ and the height of the rectangle is equal to the normalized amplitude of the corresponding matrix elements, the distance P between the center of the rectangle and the sampling cell (16) is proportional to the argument $\phi$ of the matrix element: Pir=$\phi ir/2\pi$. Two identical holograms (14) and (15) are printed. Then 2000 rectangles randomly distributed on the hologram (14) are painted with white correction fluid, on the hologram (15) the rest 2096 rectangles are crossed out. Finally, the two pictures are reduced by a microphotography on a photo negative for getting the double-card master masks (17) and (18) in the size of 2.4×2.4 mm$^2$.

The double-card master masks (9) and (10) in embodiment 1 are used for making identification card R and inspecting card R', and the identification card T and the inspecting card T' are made in the same manner by using double card master masks (17) and (18). The card R' is installed in the inspecting apparatus and card T' is kept by the operator. The images of card R and card T are potentialized in an ordinary rainbow laser hologram identification marks. During inspecting, the operator first inserts card T' into the apparatus, and then direct the tester probe to the anti-counterfeit identification marks. The coincidence of card R with card R' gives a fixed message to prove the truthfulness of the identification mark, and the coincidence of T with T' gives a preset message to certify the authenticity of the protected object.

EMBODIMENT 3

FIG. 3 is a schematic drawing for CGH double-card master mask by means of laser speckles. A Fourier lens (19) is put vertically in the path of a parallel laser beam, a nuclear track picture (20) is located at the back focus plane of the Fourier lens(19), and a photographic film is placed at a distance of 10 cm from the nuclear track picture(20). In the front of the photographic film a glass plate with an opaque information picture ★ (21) is pasted. At the first exposure a negative (22) recording laser speckles and information is obtained. After strictly replacing the information picture (21) and negative (22), another exposure is made for getting a positive(23). Both positive (23) and negative (22) have the same dimension of 4×4 cm².

Positive (23) and negative (24) are enlarged separately by a magnifying device and the magnified images are projected on coordinate paper with 128×128 small squares as sampling cells(24). The top points of the small squares are sampling points(25), and the positive (23) and negative (24) are assigned according to their transparency. Value of "1" is assigned to the sampling points in the transparent part and "0" is assigned to the sampling points in the opaque part. Except the information picture(21) where the value of "1" is assigned to the sampling points, values of depth are assigned by computer.

In these two pictures all points for information picture(21) possess transparency of 1, the transparencies of random speckles for these two pictures are complementary. After assignment these two pictures are transformed into two real matrixes $A_{22}$ and $A_{23}$. Being input in computer and converted by FFT, two output matrixes are obtained:

$B_{22}(ir)=|B_{22}(ir)|\exp[j\phi 22(i,r)]$ $B23(uv)=|B_{23}(uv)|\exp[j\phi 23(u,v)]$ Let maximum for $|B(ir)|$ and maximum for $|B(uv)|$ be equal to 1, other matrix elements decrease proportionally, these matrixes are normalized and two new matrixes are formed.

Following the procedure of embodiment 1, by means of normalized matrixes for controlling computer, two pictures (26) and (27) are obtained and transformed in double-card master masks (28) and (29) by microphotography.

Adopting the method for producing the double-card master masks R and R' by using double-card master masks (9) and (10) in the embodiment 1, the double-card master masks (28) and (29) are used for making double-card T and T'. The manufacturing procedure is the same as in embodiment 2.

EMBODIMENT 4

FIG. 4 is a schematic drawing showing the nuclear track laser hologram double-card master mask made by CGH method. Charged particles produced by accelerator or spontaneous fission fragments from natural uranium are used to irradiate polycarbonate film of 50μ thickness. By choosing appropriate exposure time the ratio between the area with track and that without track is 1:1. Then irradiated polycarbonate film is etched in KOH solution of 6.5 N at 70° C. for 60 minutes. The etched film is washed and dried by air and serves as track original(30). Another polycarbonate film of 50μ thickness is etched as a pattern of "Double dragon" leakage mask (32) which is put between said charged particle source and another identical polycarbonate film. Under the same conditions of exposure and etching as above, a "double dragon" pattern consisting of tracks is produced as information track negative (31). The information track positive (33) is formed by exposing once track original(30) overlapped by information track negative (31). Computer and special purpose program are used for micrographic scanning, depth assignment, FFT for track original (30) and information track positive(33), and double-card track master masks (36) and (37) are plotted by computer (in which sampling cells (34) and sampling points (35) are treated as in embodiment 1). The double-card track master masks (36) and (37) are reduced for making two pair double-card master masks (38) and (39) with the help of a microcopy device.

Adopting the method for producing the double-card master masks R and R' by using double-card master masks (28) and (29) in embodiment 3, the double-card master masks (38) and (39) are used for making double-card T,T'. The manufacturing procedure is the same as in embodiment 3.

EMBODIMENT 5

Figure 5A:
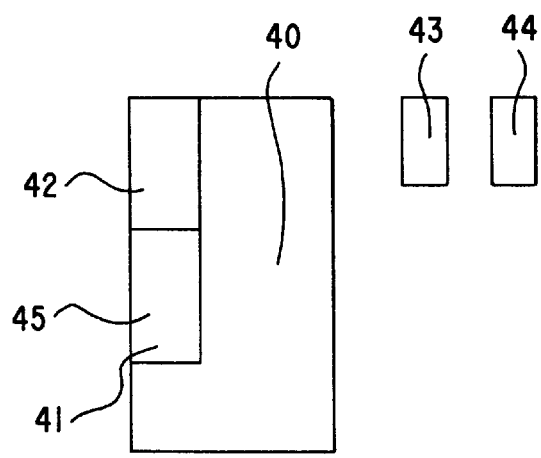
FIGS. 5a and 5b: Schematic drawing of double-card track laser hologram anticounterfeit identification mark and its inspecting identification mark.
Figure 5B:
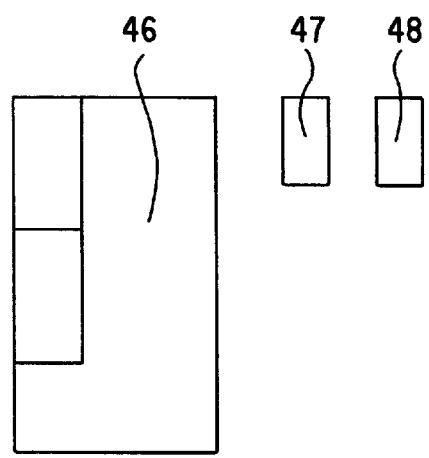

FIG. 5 shows schematic drawing of double-card track laser hologram anticounterfeit identification mark and its corresponding inspecting mark.

Figure 6:
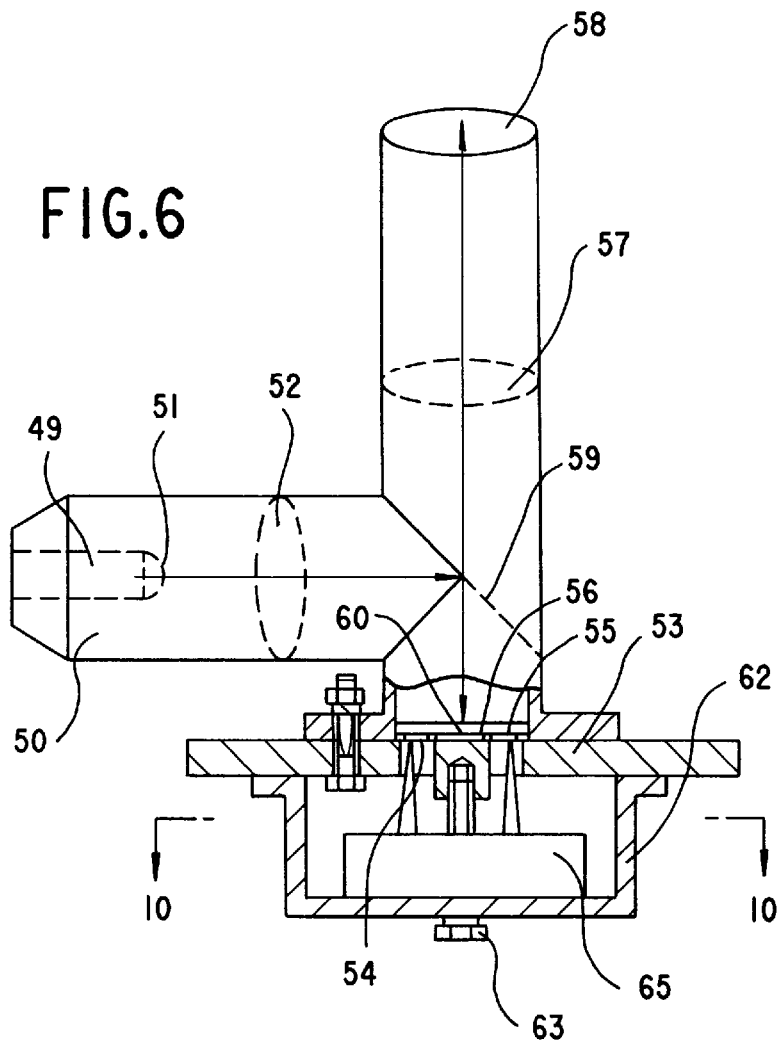
FIG. 6: one kind of inspecting optical system for a double-card track laser hologram anti-counterfeit identification mark.
Figure 10:
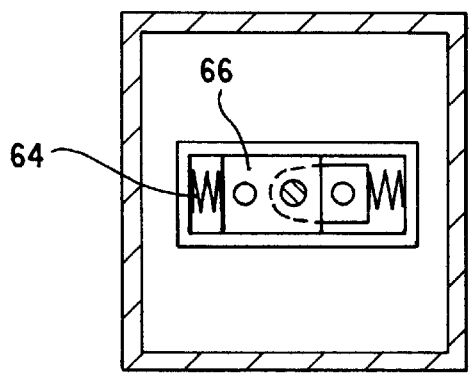
FIG. 10: a view of the embodiment of FIG. 6, along sectional line 10—10 thereof.
Figure 11:
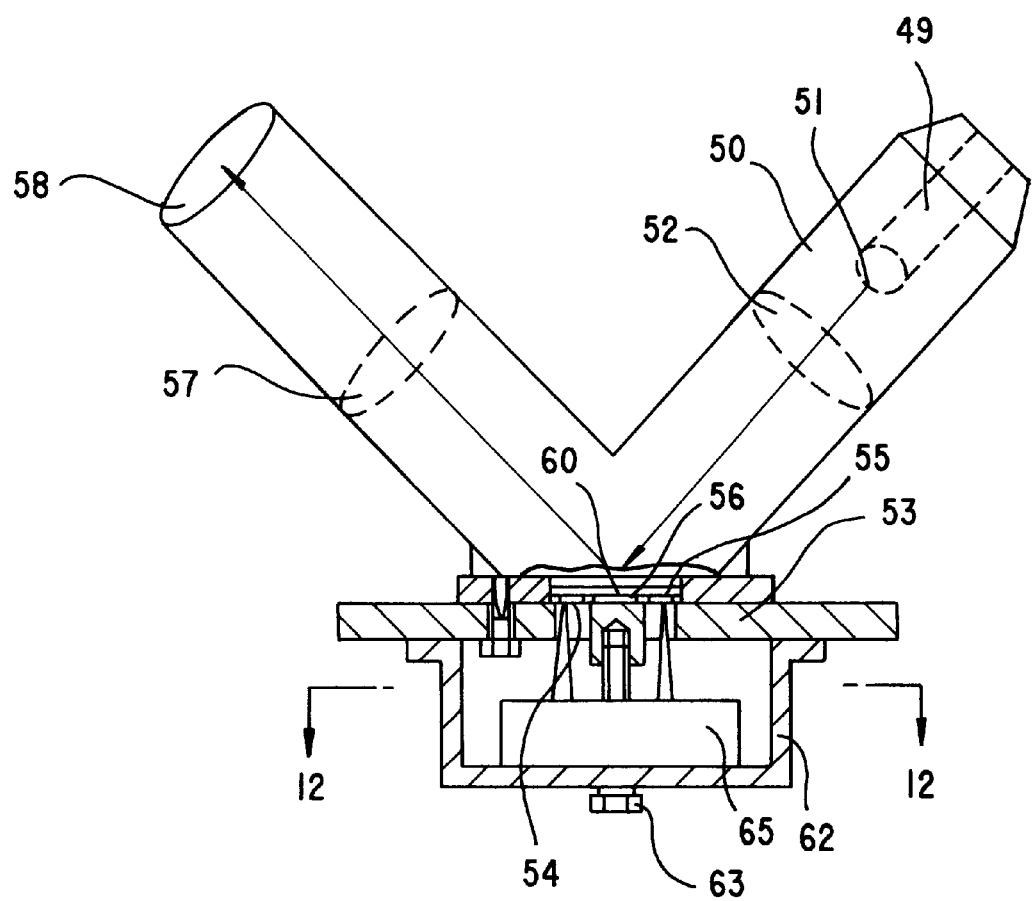
FIG. 11: a second king of inspecting optical system for double-card track laser hologram anti-counterfeit identification mark.

FIG. 6 shows schematic drawing of an embodiment of an optical system for inspecting double-card track laser hologram anti-counterfeit identification mark. FIG. 10 is a cross section of this embodiment along line 10—10 of FIG. 6. FIG. 11 is a second embodiment of an optical system for inspecting double-card track laser hologram anti-counterfeit identification mark, with FIG. 12 being a cross sectional view along line 12—12 of FIG. 11.

According to FIG. 6, the laser beam from light source (49) passes through expanding lens (51) and collimation lens (52) to become a parallel beam, then irradiates inspecting cards R', T', and identifying cards R, T, which are set on R' base (54), T' base (55), and RT base (56). Through Fourier lens (57), the synthesized pattern is presented on an observation means 58.

Figure 12:
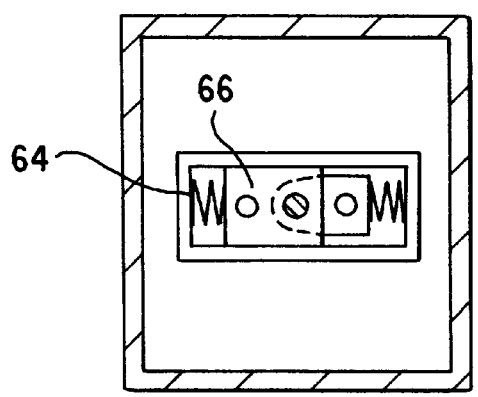
FIG. 12: a view of the embodiment of FIG. 11, along sectional line 12—12 thereof.

The configuration of FIGS. 11 and 12 are similar to the configuration of FIGS. 6 and 10; however, the configuration of FIGS. 11 and 12 do not include semitransparent-semireflection glass (59).

On the occasion of protecting small amount of large equipment, instead of rainbow hologram film produced by electromoulding technology, plates exposed by electron beam can be used directly for anti-counterfeit function. Taking embodiment 1 and embodiment 3 for examples, it will be explained in detail as follows:

In embodiment 1, a special plate-making technology of microelectronics is applied to the normalized matrixes $B_4$ and $B_5$. In the background data units(40), every small rectangle corresponding to the matrix element in each sampling cell is exposed one by one by electron beam and then exactly reduced for forming CGH double-card master masks (41) and (43). In embodiment 3 a special microelectronic technology for making plates is applied to the complex matrixes $B_{22}$ and $B_{23}$ in the same way, every small rectangle corresponding to the matrix element in each sampling cell is exposed one by one under electron beam and then exactly reduced for getting CGH double-card master masks (42) and (44) and "true or false" of the cards can be checked on the inspecting optical system of FIG. 6. The dark box(50) is divided into two parts in the directions of incident light from the light source(49) and reflection light. Behind the light source (49), an expanding lens (51) and a collimation lens (52) are installed. A reflector support (53), R' base (54), T base (55) and RT base (56) are mounted on the top of the dark box (50). On the R' base (54), the double-card master mask (41) is placed, on the T' base (55)—the double-card master mask(42), on the RT base(56)—double-card master masks (43) and (44). In the dark box(50) a Fourier lens (57) and an observation screen (58) for watching image are installed in the direction of reflection light. In the vertical inspecting optical system a semitransparent semireflection glass(59) is mounted, on the reflection support (53) an upper pressing means (60), an adjusting screw and a dismount-proof base bottom (62) are mounted. The dismount-proof base bottom (62) consists of a dismount-proof screw (63), a pair of springs (64), a pipe (65) with upper open mouth and a pair of sliding blades (66) being able to slide in the pipe. There is a setting screw on the upper pressing means (60). The location is achieved by combination use of the setting screw (67) and the location mark (45).

EMBODIMENT 6

Figures 7A, 7B, 7C:
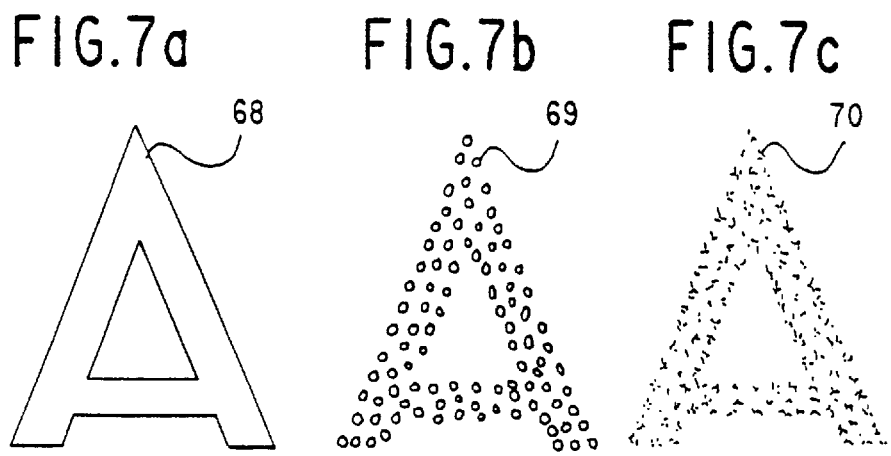
FIGS. 7a–7d: Schematic drawing for producing double-leakage mask track laser hologram anti-counterfeit identification mark.
Figure 7D:
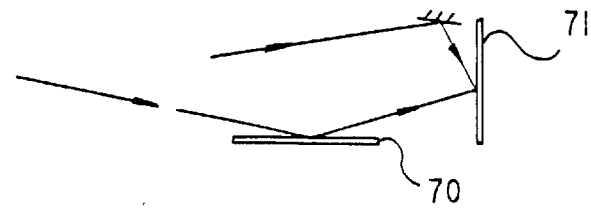

FIG. 7 shows a schematic drawing for producing double-leakage-mask track laser hologram anti-counterfeit identification mark.

Figure 8A:
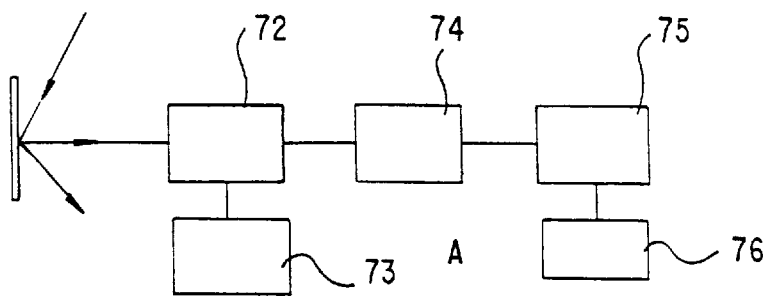
FIGS. 8A and 8B: Schematic drawing of the inspecting apparatus for double-card track laser hologram anti-counterfeit identification mark.

FIG. 8 shows a schematic drawing of the inspecting apparatus for the doublecard track laser hologram anti-counterfeit identification mark.

A letter 'A' is cut off in the middle of the polyester film of 100$\mu$, thickness, so the first leakage mask (68) is ready. Then a piece of polycarbonate film (PC) of 10$\mu$ thickness is overlapped behind the leakage mask (68) and irradiated by a heavy ion beam for a certain time, after that the PC film of 10$\mu$ thickness is taken off and put into 70° C., 6.5 N KOH solution for preparing microhole film by etching, so the second leakage mask (69) is obtained. Another polycarbonate film (PC) of 50$\mu$, thickness is placed behind the second leakage mask (69) and irradiated under Cf-252 source for a certain time, then the polycarbonate film of 50$\mu$ thickness is taken off and put into 70° C., 6.5 N KOH solution for etching for 60 minutes, after washing, cold drying and coloring, the double-track original (70) is prepared. Applying three-dimension hologram method the double-track original (70) is transferred to the photoetching master mask (71) storing the rainbow hologram information and after electromoulding turned into double-track laser anti-counterfeit identification card. At the same time the double-track original (70), saved in computer with the help of CCD and picture catching card, is served as doubletrack secondary original (70'). During inspection, light illuminates double-track laser anti-counterfeit marks, an image appears in the imaging system (72) located in the imaging direction, which can be observed by an observation system (73) or can be transformed in electronic image by photoelectric converter and input into computer (75), and compared with already stored double-track secondary original (70') in order to tell the true from the false and finally the result can be displayed on the monitor (76). Above double-track original (70) can be joined directly to developed photoresist stencil contained ordinary rainbow hologram information and then the double-track laser anticounterfeit identification mark is produced by means of electromoulding.

Figure 8B:
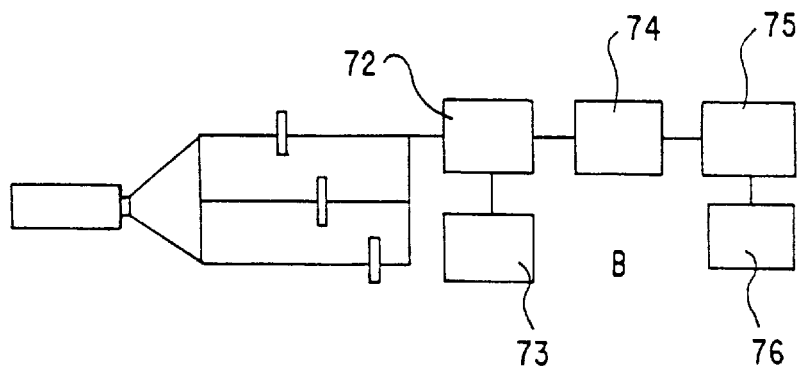
Figure 9:
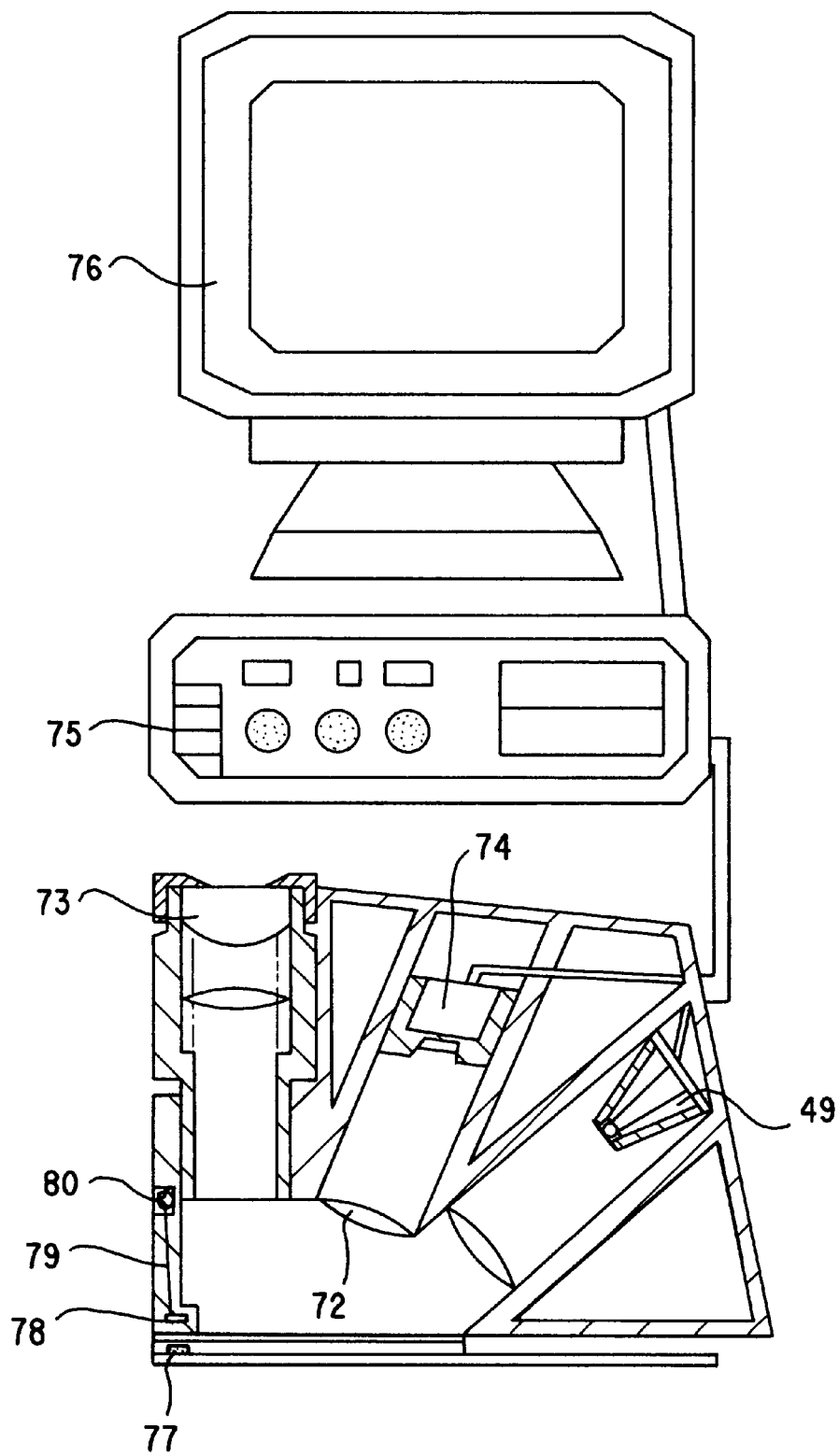
FIG. 9: Construction drawing of the inspecting apparatus for the double-card track laser hologram anti-counterfeit identification mark.

In FIG. 8B the reproducing and mixing process of the double-card track laser hologram anti-counterfeit identification card(46), card R'(47) and card T'(48) are shown by using parallel beam. FIG. 9 shows construction diagram of the inspecting apparatus for the double-card track laser hologram identification mark. An expanding lens is mounted in the front of the semiconductor laser device. A collimation lens ahead the expanding lens, a Fourier lens in the direction of diffraction and a CCD photoelectric converter (74) on the back focal plane of the Fourier lens are installed. During examination, the top of the testing probe is directed to the magnetic location mark (77) on the anticounterfeit identification mark, the indication lamp (80) lights up through conducting wire(79) by help of the magnetic switch (78) on the testing probe. At the same time, the information of the identification card and inspecting card, captured and digitized by a picture capture card, is input into computer (75), so as to be compared under the control of an identification program and the result of comparison is displayed on the monitor (76).

What is claimed is:

1. A method for producing laser hologram anti-counterfeit mark composed of identifying card and inspecting card, said method comprising the steps of:

coding predetermined or randomly-produced image originals to provide coded image originals, and converting the coded image originals into information in a frequency domain;

dividing arbitrarily a frequency spectrum plane converted from the coded image originals into two parts and using them as double-card master masks;

using an optic method or a CGH (computer-generated hologram) method to transform at least one of the double-card master masks to a first photoresist plate;

using the optic method or the CGH method to transform the other one of the double-card master masks to a second photoresist plate;

making the identifying card and the inspecting card by one of developing, electroforming, and die pressing above said first and second photoresist plates separately onto an identifying card substrate and an inspecting card substrate.

2. A method in accordance with claim 1, wherein said image original is an arbitrary sign.

3. A method in accordance with claim 1, wherein said image original is a randomly-produced picture.

4. A method in accordance with claim 1 or 3, wherein said random picture is a group track of microscopic particles in physics, chemistry or biology, or its formation converted to spectrum domain.

5. A method in accordance with claim 1 or 2, wherein said randomly-produced image original is an irregular microscopic pattern produced by computer or its formation converted to spectrum domain.

6. A method in accordance with claim 1, wherein said image original is at least one nuclear track picture.

7. An inspecting apparatus for said double-card track laser hologram anti-counterfeit identification mark, said apparatus comprising:

a light source;

an identifying card base and inspecting card base with a location function;

a testing probe comprising an imaging system and a photoelectronic converter unit; and a processor;

wherein said imaging system comprises an optical device for conversion of an identifying card and inspecting card representative of information in a frequency domain to information in a space domain, said optical device including an inspecting screen installed for directly observing results, and wherein said processor is connected to said photoelectronic converter unit and is controlled by an identifying program of the electronic identification system.

8. An apparatus in accordance with claim 7, wherein: said imaging system includes a double-arm dark box and an optical system, consisting of a light source, an expanding lens, and a collimation lens, at the end of said dark box, a reflection frame is installed on which said inspecting card base and said identifying card base are mounted, in the light reflection direction of said dark box, a Fourier lens and an inspecting screen for observing information image are installed at a distance of focal length of said Fourier lens.

9. An apparatus in accordance with claim 7, wherein: said identifying card base with location function comprises an upper pressing means mounted on said reflection frame, at the same time as said upper pressing means is pushed down on said identifying card, the location function is completed through adjusting the setting screw mounted on said upper pressing means to illuminate the anti-counterfeit marks.

10. An apparatus in accordance with claim 7, wherein: said inspecting card base with location function includes a device made of transparent material with a dismount-proof base bottom in which said inspecting card is sealed, said dismount-proof base bottom comprises a dismount-proof screw, a pair of springs, a pair of pipes with open upper ends and a pair of sliding vanes, which can slide in said pipes; a hole is drilled through the overlapped half parts of said sliding vanes, which are fixed by using said dismount-proof screw, through each of the unoverlapped parts of said sliding vanes a hole is drilled and said two springs are used to pull said sliding vanes to both sides, the middle part of said vanes is connected to the inspecting card R', when said dismount-proof screw moves away from said sliding vanes, under said spring's force said two vanes jump away to both sides, making R' card connected with them broken by itself.

11. An apparatus in accordance with claim 7, wherein: said identifying card base and said inspecting card base can be made of miniature physico-chemical materials, the location function is realized with the help of physico-chemical interaction together with the setting sign on said identifying card base and said inspecting card base.

12. An apparatus as recited in claim 7, wherein the optical device for conversion is a Fourier lens.

* * * * *